United States Patent [19]
Adelizzi et al.

[11] 3,750,398
[45] Aug. 7, 1973

[54] STATIC SEAL STRUCTURE

[75] Inventors: Richard S. Adelizzi, Marlton, N.J.; James A. Laurelli, Springfield, Pa.

[73] Assignee: Westinghouse Electric Corporation, Pittsburgh, Pa.

[22] Filed: May 17, 1971

[21] Appl. No.: 143,774

[52] U.S. Cl. .............. 60/39.37, 60/39.32, 415/175
[51] Int. Cl. ............................................. F02c 7/20
[58] Field of Search .................... 60/39.32, 39.37; 415/171, 175, 136

[56] References Cited
UNITED STATES PATENTS

| | | | |
|---|---|---|---|
| 3,018,624 | 1/1962 | Bonsall et al. | 60/39.37 |
| 2,743,579 | 5/1956 | Gaubatz | 60/39.37 |
| 2,594,808 | 4/1952 | Rubbra | 60/39.37 |
| 3,602,605 | 8/1971 | Lee | 415/175 |
| 3,609,968 | 10/1971 | Mierfey et al. | 60/39.32 |

FOREIGN PATENTS OR APPLICATIONS

| | | | |
|---|---|---|---|
| 925,349 | 5/1963 | Great Britain | 60/39.37 |

Primary Examiner—Carlton R. Croyle
Assistant Examiner—Warren Olsen
Attorney—A. T. Stratton, F. P. Lyle and B. L. Samlan

[57] ABSTRACT

A static seal structure in a gas turbine which prevents leakage of pressurized compressor air from a plenum chamber into the first stage of the turbine around the combustion chambers. The structure comprises two semicircular frame halves, which have openings to receive the combustion chambers. The radially outer portion of the frame is secured to the turbine casing and statically seals around the radially outer portions of the combustion chambers and the radially extending sides between adjacent combustion chambers. The radially inner portion of the frame is secured to an annular seal member which cooperates with an annular seal housing structure to statically seal around the radially inner surfaces of the combustion chambers.

3 Claims, 4 Drawing Figures

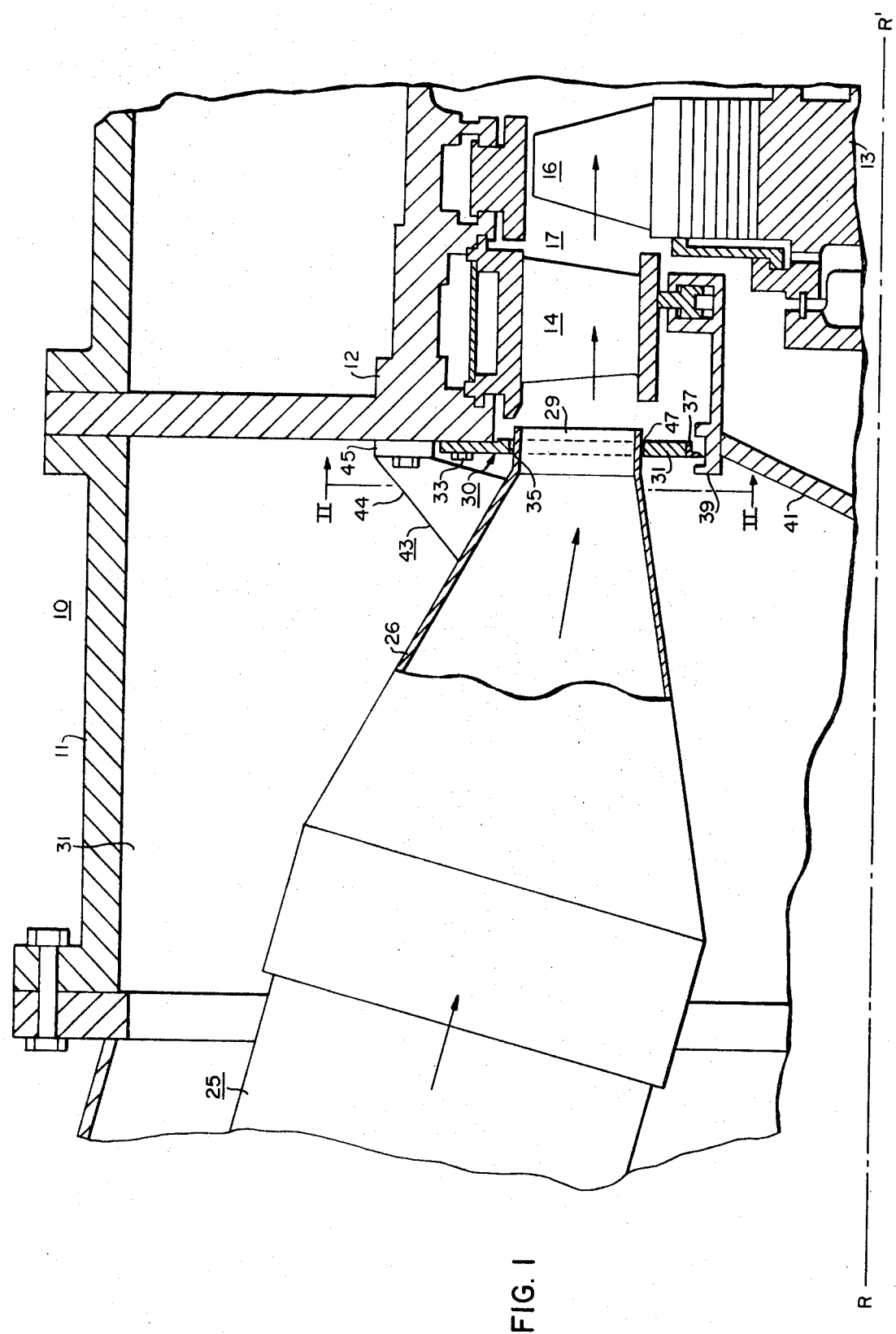

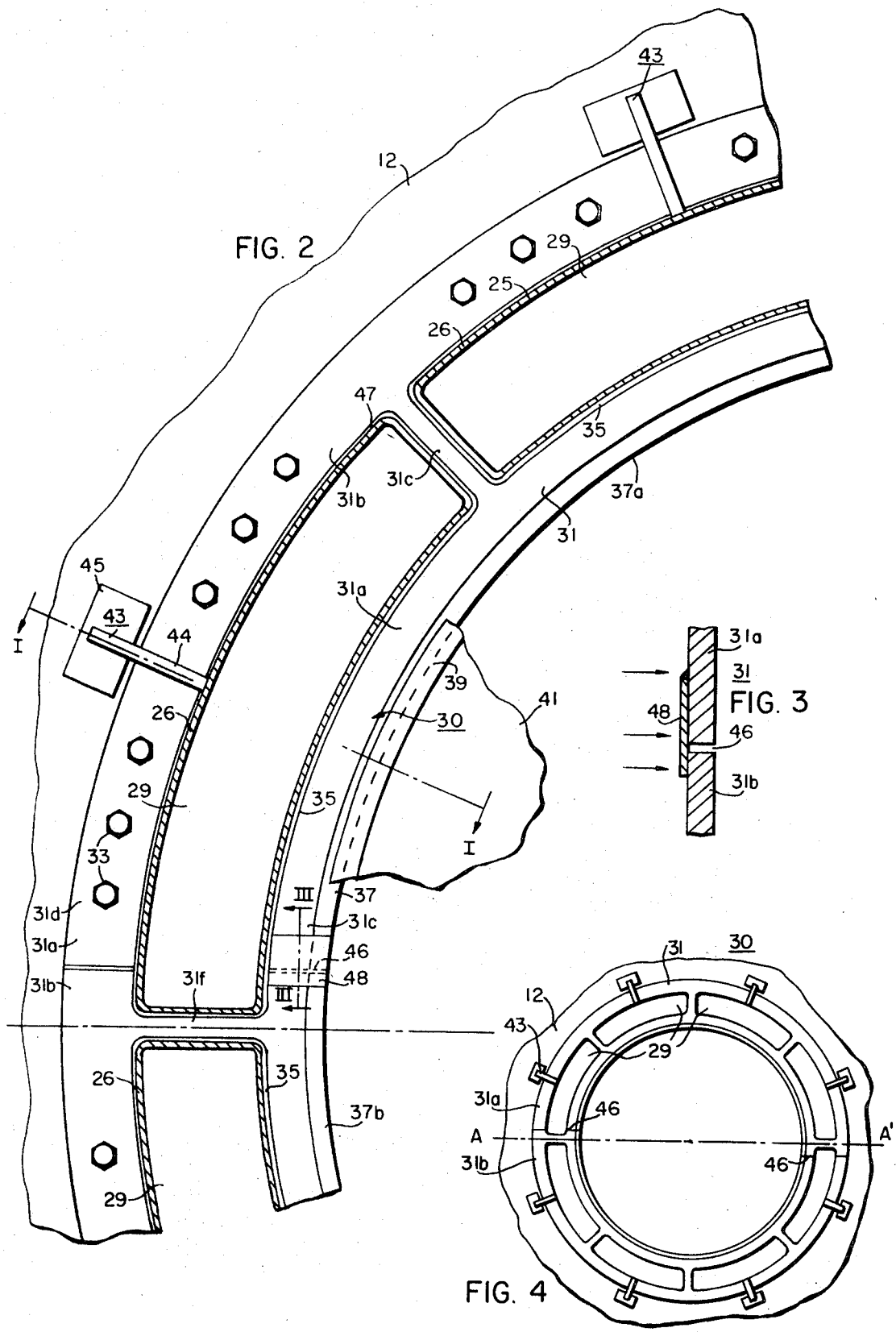

STATIC SEAL STRUCTURE

BACKGROUND OF THE INVENTION

The following invention relates to gas turbines and more specifically to a structure for preventing leakage of pressurized combustion air from a plenum chamber into the first stage of the turbine.

As the trend towards larger gas turbines continues, especially in industrial use, there is a corresponding increase in operating temperature and pressure, both of which contribute to an increased turbine performance. Increased efficiency also depends upon preventing substantially leakage of pressurized air from undesirably mixing with hot motive fluid which is directed to the first stage of the turbine. The pressurized compressor air leaking into the first stage has a different speed and direction than the hot motive fluid, and the compressor air causes undesirable vibrations in the turbine blades. Consequently, it is desirable to design a system to more effectively minimize the leakage of the higher pressure, cooler air to the first stage of the turbine. One present system to minimize the leakage of the pressurized combustion air into the first stage of the turbine is disclosed in G. M. Mierley et al., Ser. No. 32,926 filed on Apr. 29, 1970, now U.S. Pat. No. 3,609,968, and assigned to the same assignee as the present invention. In the Mierley et al. disclosure, a plurality of annular "picture frame" structures enclose the outlets of the corresponding combustion chambers. The adjacent radially extending sides define a plurality of radially extending gaps in which a plurality of self-adjusting seal structures are disposed to prevent leakage of the pressurized compressor air through these radial gaps. The radially inner portions of the picture frames cooperate with a movable spring seal structure to seal the radially inner portions of the combustion chambers.

Although the self-adjusting seal structure as disclosed in Mierley et al is presently in operation, several problems have been encountered. First, there are large expenses involved with the self-adjusting seal structure, namely: (a) in constructing and properly positioning the individual picture frame structures within the turbine; (b) in manufacturing and installing the spring structures which close the radial gaps between adjacent combustion chambers; (c) in manufacturing and installing the spring seal structures used to prevent leakage around the radially inner portions of the combustion chambers. Secondly both the spring seal structures used to close the radial gaps and those used to close the radial inner portions have moving parts which are undesirable, especially under a high temperature and pressure environment, since they are more likely to fail than a static seal structure.

Therefore, it would be desirable to design a seal structure which would be less expensive to manufacture and install, and furthermore, to reduce as many moving parts as possible within the high pressure and high temperature environment.

SUMMARY OF THE INVENTION

An outer casing structure encloses and partially defines a plenum chamber in a gas turbine power plant which is pressurized by air from a compressor. A plurality of combustion chambers are equally spaced in an annular array within the plenum chamber. Each combustion chamber has a transition duct member at its downstream end which is of substantially arcuate cross section at the outlet. The outlets jointly form an annular outlet to direct hot motive gases to the first stage. The transition members are in spaced relation forming an annular array and thereby defining a plurality of radially extending gaps.

In accordance with the invention, a static seal structure is disposed within the turbine between the plenum chamber and the first stage of the turbine. The seal structure includes a frame structure comprising two semicircular frame halves, which have a plurality of openings therein, corresponding in shape and number to the transition duct portions. The radially outer portion of the frame is secured to the turbine casing and an annular seal member is secured to the radially inner portion.

The transition members are inserted into the openings in the frame, and the radially outer portion of the frame cooperates with the casing to seal the radially outer surfaces around the combustion chambers. The frame seals the radial gaps between the adjacent combustion chambers and the radially inner portion of the frame and the seal members cooperate with an annular seal housing structure to prevent leakage around the radially inner surfaces of the transition members from the plenum chamber to the first stage of the turbine.

The frame is secured directly to the turbine casing so that very minimal thermal expansion occurs in the casing and the frame attached thereto. Therefore, a static seal structure can be utilized at the radially outer and inner surfaces around the combustion chambers, and the movable spring sealing structure previously used on the radially inner portions is eliminated. Furthermore, because of the two-piece frame structure rather than the individual segmented picture frame structures previously used, the spring sealing structures between adjacent combustion chambers are thereby eliminated. This spring structure has virtually no moving parts and is substantially less expensive to manufacture and assemble than the prior movable sealing structures.

BRIEF DESCRIPTION OF THE DRAWINGS

FIG. 1 is a view showing a partial longitudinal section of an axial flow gas turbine having a seal structure formed in accordance with the principles of this invention;

FIG. 2 is a view taken substantially along line II—II in FIG. 1;

FIG. 3 is an enlarged view taken along line III—III in FIG. 2; and

FIG. 4 is a view of the seal structure on a reduced scale along a transverse plane.

DESCRIPTION OF THE PREFERRED EMBODIMENT

Referring to the drawings in detail and more particularly to FIG. 1, there is shown a portion of an axial flow gas turbine 10. The turbine 10 comprises an outer casing 11 of circular cross section, an inner casing 12 of generally tubular shape, encompassed by the outer casing 11, and a rotor structure 13 rotatably supported within the inner casing 12 in any suitable manner (not shown). At least one annular row of rotating blades 16 (only one row being shown) extend radially outward from rotor 13. Cooperatively associated with the rotating blades 16 to form stages for motor fluid expansion is at least one annular row of stationary blades 14 (only one row being shown) which blades are supported within the inner casing 12. The first stationary row of blades 14 and the first rotating row 16 is defined as the first stage 17.

Hot motive fluid, such as pressurized combustion gas is generated in a plurality of circumferentially disposed combustion chambers 25. The chambers 25 are of the well known cannister type and have cylindrical portions at the upstream ends and corresponding transition duct members 26 at the downstream ends which change in cross sectional shape from circular to generally arcuate at the outlets 29 (FIG. 2). The outlets 29 are in a closely spaced annular relation and jointly form an annular outlet (FIG. 4) to direct the hot motive gases to the first stage 17 in a full and continuous peripheral stream. The gases flow past the stationary blades 14, as shown by the arrows from left to right, with resulting expansion of the gases to rotate the rotor structure 13 around its rotational axis R—R'. The combustion chambers 25 are disposed in a space or plenum chamber 28 partially defined by the outer casing 11, which is presurized by air from a compressor (not shown). The pressurized air is directed into the combustion chambers 25 to mix with fuel to form a combustible mixture which is burned to provide the hot motive gases.

An annular static seal structure 30 is firmly secured to the inner casing 12 by any suitable means, such as bolts 33 (FIGS. 1 and 2). The seal structure 30 is comprised of a frame structure 31 having an upper half 31a and a bottom half 31b which are substantially similar to each other (FIGS. 2 and 4). A plurality of openings 35 similar in size and shape to the transition portions 26 are defined in the frame structure 31 and are of generally arcuate shape.

Secured to the radially inner portion of the frame 31 is an annular sealing structure or tine 37 (FIGS. 1 and 2) projecting radially inwardly. The sealing structure 37 can be formed integrally with the frame 31 or it may be, as shown, a separate structure secured to the frame 31 by any suitable means. The sealing structure may be comprised of two arcuate halves 37a and 37b corresponding to the frame halves 31a and 31b. A seal housing structure 39 cooperates with the line 37 to form a static seal structure to prevent leakage of air around the radially inner surfaces of the tranistion members 26 into the first stage 17 of the turbine 10. The housing structure 39 may be a part of a generally tubular member 41 which defines the inner wall of the plenum chamber and seals the plenum chamber from the first stage 17 of the radially inner portion of the transition members 26, as well known in the art.

A plurality of support brackets 43 are provided to partially secure and support the transition portions 26 of the combustion chambers 25 to the inner casing 12, one bracket corresponding to each transition. Each bracket 43 has a radially outward extending portion 44 and an annular mounting flange portion 45 (FIGS. 1 and 2). The radial portion 44 is secured to the transition member 26 and the mounting portion 45 is secured to a radially extending portion of the inner casing 12 at a point radially outward relative to the frame structure 31.

As best seen in FIGS. 2 and 4, the upper and lower halves of the frame structure 31a and 31b, respectively, are separated or spaced at 46. The frame halves 31a and 31b are disposed within the casing so that the spacing 46 is along a plane substantially transverse to one of the combustion chambers 26 and is above the horizontal part line A—A' on one side of the turbine and is below the horizontal part line A—A' on the other side of the turbine. If the frame structure 31 is made in one piece, the radially inner wall member 31c and the radially outer wall member 31d are cut in a plane going through opening 29 and not through radial wall member 31f between adjacent openings 29. As best seen in FIG. 4, the two halves 31a and 31b are substantially similar if one of the halves is rotated and superimposed on the other.

The radially outer wall member 31d of the flange 31 is secured to the inner casing 12 (FIG. 2) and most of the radially outer portion of the spacing 46 is blocked by the inner casing. The radially inner portion 31c of space 46, however, must be sealed to prevent leakage of the pressurized air in the plenum chamber 28 into the first stage 17.

Referring to FIGS. 2 and 3, a sealing member or metallic plate 48 is secured onto the upper half 31a of the frame 31 to block the spacing 46 on the radially inner side 31c of the frame. The plate 48 extends from the sealing structure 37 to the opening 29. The separation of the two halves 31a and 31b at the opening 46 allows for minimum cutting of the frame 31 and provides for a minimum of spacing 46 to be sealed. Furthermore, since there is not a substantial annular area between adjacent combustion chambers 25, a cut or split of the radial wall member 31f of frame 31 could structurally weaken the frame and possibly cause a breakthrough in the radial wall member 31f by the combustion chambers, as the chambers circumferentially expand.

As best seen in FIGS. 1 and 2, the transition portions 26 are inserted into the openings 35 in the frame 31 and partially extend therethrough. Clearance space 47 is provided around each transition portion, and amount of clearance is determined by the maximum design condition i.e., that occurring during the startup of the turbine 10 since the relatively thin-wall transition portions 26 heat up and expand more quickly than the thicker wall casing 12 and the frame 31 attached thereto. Therefore, there is sufficient clearance between the transitions 26 and the frame 31 to allow for the difference in thermal expansion between the transition members 26 and the frame 31. This clearance is further designed to be at a minimum during normal operating conditions. While it is undesirable for any substantial leakage of pressurized air to leak into the turbine first stage, any slight leakage such as that may occur, will not have an adverse effect and actually may assist in partially cooling the hot combustion gases entering the first stage 17.

Any thermal expansion occurring in the annular frame structure 31 is accommodated by the spacing 46 between the upper and lower halves 31a and 31b, respectively. The sealing member 48 is secured to only one of the frame halves and maintains a sealing relation as the free end slides on the other corresponding frame half as the frame expands or contracts. Furthermore, the sealing member 48 is secured to the frame 31 on the plenum chamber side of the frame 31 (FIG. 3) so that the pressurized air, as indicated by the arrows, tends to maintain a strong sealing relation between the sealing member and the frame 31 to minimize leakage through space 46.

The sealing structure 30 besides being simpler and less costly than present sealing structures is more dependable in sealing the plenum chamber 28 from the first stage 17 of the turbine 10. The radially outer portions around the combustion chambers 25 (FIGS. 1 and 2) are sealed by cooperation of the radially outer wall member 31d of the frame 31 and the inner casing 12 of the turbine. The radial gaps between adjacent combustion chambers 25, at their transition portions 26 (FIG. 2), are sealed by the radially extending side wall members 31f of frame 31. The radially inner areas around the transition portions 26 are sealed by the cooperation of the annular sealing structure 37 secured to the radially inner wall member 31c of frame 31, the seal housing 39, and the tubular member 41.

The sealing structure 30 is substantially a static type of seal since no complicated spring seals are needed as previously described in Mierley et al. A static seal can be used at the radially inner portion because the frame 31 is directly secured to the inner casing 12. Therefore, the inner casing 12, the frame 31, the seal structure 37, the seal housing 39, and the tubular member 41 remain at approximately the same temperature, so that no substantial growth rate exists therebetween. Consequently, relative thermal expansion between the sealing structure 37 and the seal housing 39 is nominal, and a very close tolerance can be maintained between the seal 37 and the sealing housing 39. In Mierley et al, the picture frame sealing structures are attached to the transition ducts. The frame structures heat up more than the seal housing, thereby resulting in substantial temperature differentials between the movable frames and the seal housing. Consequently, a movable seal structure must be employed.

An additional advantage of the present sealing structure 30 is that the frame 31 assists in aligning the transition portions 26 of the combustion chambers 25. The frame 31, being comprised of two pieces 31a and 31b, simplifies the initial setup and of course the frame is less expensive to manufacture than the picture frame sealing structures. Additionally, the movable sealing structures are eliminated.

What is described then is a static seal structure 30, which minimizes the amount of pressurized compressor air which can leak from the plenum chamber 28 into the first stage 17 of a turbine 10 around the transition portions 26 of the combustion chambers 25. The annular frame 31 prevents leakage around the radially outer portions of the transition members 26 and minimized leakage through the radially gaps between adjacent combustion chambers without any moving seal structure. The radially inner portion of the frame 31 has an annular sealing structure 37 which cooperates in a static type seal arrangement with a housing structure 39 and tubular member 41, to effectively seal the radially inner portions around the transition members of the combustion chambers. Although only one embodiment of the invention has been shown, it will be obvious to those skilled in the art that the invention is not so limited, but is susceptible to various other changes without departing from the spirit thereof.

We claim as our invention:

1. A static seal structure for an axial flow gas turbine, said turbine having a casing structure enclosing a plenum chamber, a plurality of combustion chambers disposed in an annular array in said plenum chamber, each of said combustion chambers having a generally axial transition member at one end thereof to direct hot motive gases from the combustion chamber to a first stage of the turbine, a generally annular frame structure disposed between the plenum chamber and said first stage, said frame structure having a plurality of openings corresponding in shape and position to said transition members and each transition member extending through one of said openings, said frame structure closing the spaces between adjacent transition members, an annular seal member secured to the radially inner edge of the frame structure, an annular seal housing structure cooperating with said seal member to prevent leakage from the plenum chamber past the edge of the frame, said frame structure being divided into two spaced halves along a plane intersecting one of said openings, and a sealing member covering and sealing at least a portion of each of the spaces between halves of the frame, said last-mentioned sealing members each being secured to one of said halves on the plenum chamber side thereof.

2. The structure of claim 1 in which the spaces between halves of the frame structure extend radially, and said frame structure is mounted on the casing structure in a manner such that the casing structure covers the radially outer portions of said spaces.

3. The structure of claim 2 in which the casing structure is divided into two halves on a horizontal plane and the frame structure is divided into halves on a plane inclined to the horizontal.

* * * * *